(12) United States Patent
Ahn

(10) Patent No.: US 8,235,904 B2
(45) Date of Patent: *Aug. 7, 2012

(54) ULTRASOUND SYSTEM AND METHOD FOR FORMING BC-MODE IMAGE

(75) Inventor: Chi Young Ahn, Seoul (KR)

(73) Assignee: Medison Co., Ltd., Kangwon-do (KR)

(*) Notice: Subject to any disclaimer, the term of this patent is extended or adjusted under 35 U.S.C. 154(b) by 540 days.

This patent is subject to a terminal disclaimer.

(21) Appl. No.: 12/270,744

(22) Filed: Nov. 13, 2008

(65) Prior Publication Data

US 2009/0124904 A1  May 14, 2009

(30) Foreign Application Priority Data

Nov. 14, 2007 (KR) .................. 10-2007-0116204

(51) Int. Cl.
*A61B 8/00* (2006.01)
(52) U.S. Cl. ................. 600/440; 600/437
(58) Field of Classification Search ............. 600/437, 600/438, 441, 443, 456, 465; 382/128; 331/158; 345/419; 374/117; 434/262; 455/266
See application file for complete search history.

(56) References Cited

U.S. PATENT DOCUMENTS

| | | | | |
|---|---|---|---|---|
| 4,228,804 A | * | 10/1980 | Holasek et al. | 600/443 |
| 5,447,158 A | * | 9/1995 | Nakajima et al. | 600/455 |
| 5,492,125 A | * | 2/1996 | Kim et al. | 600/443 |
| 5,509,413 A | * | 4/1996 | Akama et al. | 600/438 |
| 5,876,341 A | * | 3/1999 | Wang et al. | 600/441 |
| 5,931,784 A | | 8/1999 | Kajiwara et al. | |
| 5,961,462 A | * | 10/1999 | Loupas et al. | 600/453 |
| 6,071,240 A | * | 6/2000 | Hall et al. | 600/443 |
| 6,083,168 A | * | 7/2000 | Hossack et al. | 600/443 |
| 6,123,670 A | * | 9/2000 | Mo | 600/447 |

(Continued)

FOREIGN PATENT DOCUMENTS

JP       06-178777       6/1994

(Continued)

OTHER PUBLICATIONS

Korean Office Action issued in Korean Patent Application No. 10-2007-0116204, mailed Jul. 1, 2011.

*Primary Examiner* — Brian Casler
*Assistant Examiner* — Serkan Akar
(74) *Attorney, Agent, or Firm* — McDermott Will & Emery LLP (57) ABSTRACT

A BC-mode image with an improved frame rate in an ultrasound system is formed. A transmit/receive unit forms first and second receive signals responsive to first and second control signals. An image processing unit is configured to form a B-mode image and a C-mode image based the first and second receive signals and to combine them to form a BC-mode image. A control unit is configured to divide scan lines into a plurality of scan line groups and to generate a third control signal for alternately selecting one of the scan line groups for a B-mode scan for forming scan line group receive signals. The control unit repeatedly generates the second and third control signals. The image processing unit is configured to update the first receive signals with the scan line group receive signals and form a B-mode image based on the updated first receive signals.

8 Claims, 6 Drawing Sheets

U.S. PATENT DOCUMENTS

| | | | |
|---|---|---|---|
| 6,176,830 B1 * | 1/2001 | Freiburger | 600/453 |
| 6,210,168 B1 * | 4/2001 | Aiger et al. | 434/262 |
| 6,368,277 B1 * | 4/2002 | Mao et al. | 600/441 |
| 6,425,868 B1 * | 7/2002 | Tamura | 600/454 |
| 6,436,049 B1 * | 8/2002 | Kamiyama et al. | 600/458 |
| 6,450,961 B1 * | 9/2002 | Shiki et al. | 600/458 |
| 6,500,122 B1 * | 12/2002 | Washburn et al. | 600/443 |
| 6,733,449 B1 * | 5/2004 | Krishnamurthy et al. | 600/437 |
| 6,932,767 B2 * | 8/2005 | Landry et al. | 600/437 |
| 7,223,242 B2 * | 5/2007 | He et al. | 600/454 |
| 7,771,355 B2 * | 8/2010 | Lin et al. | 600/437 |
| 7,946,990 B2 * | 5/2011 | Srinivasan et al. | 600/454 |
| 2002/0165455 A1 * | 11/2002 | Lysyansky | 600/458 |
| 2004/0073113 A1 * | 4/2004 | Salgo et al. | 600/438 |
| 2004/0186379 A1 * | 9/2004 | Landry et al. | 600/437 |
| 2005/0093859 A1 * | 5/2005 | Sumanaweera et al. | 345/419 |
| 2005/0251040 A1 * | 11/2005 | Relkuntwar et al. | 600/437 |
| 2005/0267367 A1 * | 12/2005 | Kerby et al. | 600/437 |
| 2006/0079778 A1 * | 4/2006 | Mo et al. | 600/447 |
| 2006/0100515 A1 * | 5/2006 | Nakata | 600/441 |
| 2006/0173328 A1 * | 8/2006 | Fan et al. | 600/441 |
| 2007/0038104 A1 | 2/2007 | Hyun | |
| 2007/0054645 A1 * | 3/2007 | Pan | 455/266 |
| 2007/0073152 A1 * | 3/2007 | Washburn | 600/441 |
| 2007/0078347 A1 * | 4/2007 | Srinivasan et al. | 600/465 |
| 2007/0081576 A1 * | 4/2007 | Ramamurthy et al. | 374/117 |
| 2007/0241828 A1 * | 10/2007 | Nakamura et al. | 331/158 |
| 2009/0012393 A1 * | 1/2009 | Choi | 600/437 |
| 2009/0062643 A1 * | 3/2009 | Willsie | 600/437 |
| 2009/0124904 A1 * | 5/2009 | Ahn | 600/443 |
| 2009/0124905 A1 * | 5/2009 | Ahn et al. | 600/443 |

FOREIGN PATENT DOCUMENTS

| | | |
|---|---|---|
| KR | 1999-014883 | 2/1999 |
| KR | 10-2007-0000565 | 1/2007 |
| KR | 10-2007-0024096 | 3/2007 |

* cited by examiner

ULTRASOUND SYSTEM AND METHOD FOR FORMING BC-MODE IMAGE

The present application claims priority from Korean Patent Application Ser. No. 10-2007-0116204 filed on Nov. 14, 2007, the entire subject matter of which is incorporated herein by reference.

BACKGROUND OF THE INVENTION

1. Technical Field

The present invention generally relates to ultrasound systems, and more particularly to an ultrasound system and a method for forming a BC-mode image.

2. Background Art

An ultrasound system has become an important and popular diagnostic tool due to its non-invasive and non-destructive nature. Modern high-performance ultrasound imaging diagnostic systems and techniques are commonly used to produce two- or three-dimensional images of internal features of patients.

The ultrasound system may provide a BC-mode image indicating a blood flow or a motion of a target object, which is estimated by using a Doppler effect, on a B-mode image. The BC-mode image is a combination image comprising a B-mode image of a grey scale and a color flow image (i.e., C-mode image) indicating the blood flow or the motion of the target object. The BC-mode image may provide anatomical information as well as information regarding the blood flow or the motion of the target object.

The conventional ultrasound image may form the B-mode image and the C-mode image with different frame rates, and then combine the B-mode image with the C-mode image to thereby form the BC-mode image. Since the frame rate of the BC-mode may not be enough to obtain information regarding the blood flow or the motion of the target object such as a cardiac muscle, the frame rate of the BC-mode must be improved such that motion information of the target object such as a cardiac muscle, which is rapidly moved, can be accurately provided.

DETAILED DESCRIPTION OF THE INVENTION

Figure 1:
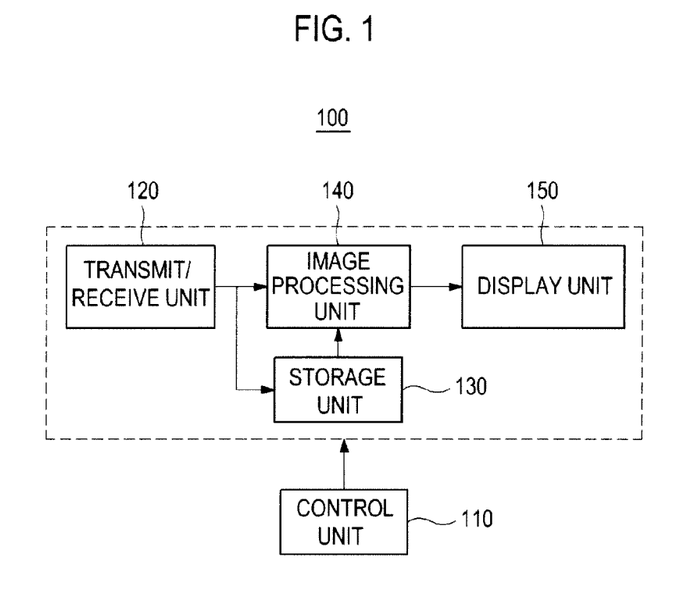
FIG. 1 is a block diagram showing an embodiment of an ultrasound system.

FIG. 1 is a block diagram showing an embodiment of an ultrasound system. As shown in FIG. 1, the ultrasound system 100 may include a control unit 110, a transmit/receive unit 120, a storage unit 130, an image processing unit 140 and a display unit 150. The ultrasound system 100 may further include an input unit (not shown) to receive input information from a user. The input information may include setup information for setting a color box on a B-mode image, i.e., position and size information of the color box.

The control unit 110 may be configured to control the formation of a BC-mode image in consideration of a time duration required to form a B-mode image and a time duration required to form a C-mode image. The control unit 110 may be further configured to control operations of the transmit/receive unit 120, the storage unit 130, the image processing unit 140 and the display unit 150.

Figure 2:
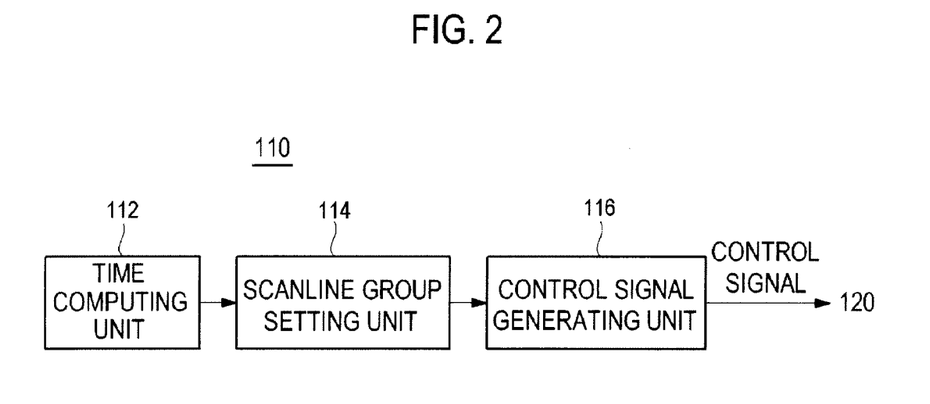
FIG. 2 is a schematic diagram showing an embodiment of a control unit.

FIG. 2 is a block diagram showing an embodiment of the control unit 110. A time computing unit 112 may be operable to compute a time duration required to form a B-mode image ("first time duration") and a time duration required to form a C-mode image ("second time duration"). The first time duration ($T_B$) and the second time duration ($T_C$) may be computed by using the following equations (1) and (2).

$$T_B = N_B / PRF_B \quad (1)$$

$$T_C = N_C \times PS / PRF_C \quad (2)$$

wherein $N_B$ represents the number of scan lines used to form the B-mode image, $PRF_B$ represents a pulse repetition frequency used to form the B-mode image, NC represents the number of the scan lines used to form the C-mode image, PS represents a packet size indicating repetition times of transmitting and receiving an ultrasound beam along one scan line, and $PRF_C$ represents a pulse repetition frequency used to form the C-mode image.

A scan line group setting unit 114 may be configured to set a plurality of scan line groups based on the first time duration $T_B$ and the second time duration $T_C$. For example, when the first time duration $T_B$ is 8 ms and the second time duration $T_C$ is 2 ms, scan lines $S_1$-$S_{64}$ illustrated in FIG. 3 may be divided into four scan line groups $SG_1$, $SG_2$, $SG_3$ and $SG_4$ based on a value obtained through dividing the first time duration $T_B$ by the second time duration TC, i.e., 8 ms/2 ms 4, as follows.

Figure 3:
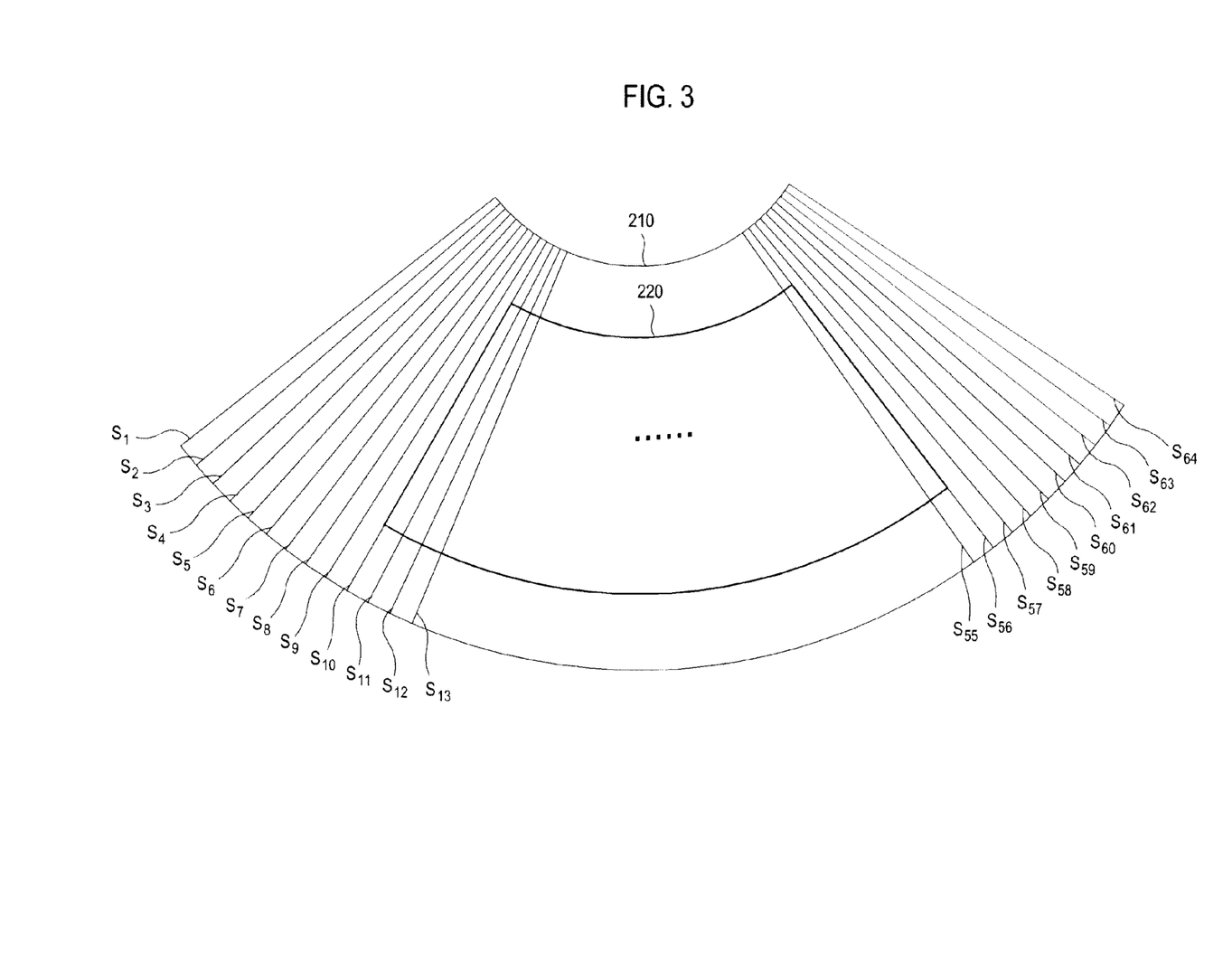
FIG. 3 is a schematic diagram illustrating a display example of a B-mode image, a plurality of scan lines and a color box.

First scan line group SG1={$S_1$, $S_5$, $S_9$, $S_{13}$, $S_{17}$, ..., $S_{53}$, $S_{57}$, $S_{61}$}

Second scan line group SG2={$S_2$, $S_6$, $S_{10}$, $S_{14}$, $S_{18}$, ..., $S_{54}$, $S_{58}$, $S_{62}$}

Third scan line group SG3={$S_3$, $S_7$, $S_{11}$, $S_{15}$, $S_{19}$, ..., $S_{55}$, $S_{59}$, $S_{63}$}

Fourth scan line group SG4={$S_4$, $S_8$, $S_{12}$, $S_{16}$, $S_{20}$, ..., $S_{56}$, $S_{60}$, $S_{64}$}

A control signal generating unit 116 may be configured to generate a control signal for controlling transmission and reception of the ultrasound beam. The control signal may include a first control signal for controlling the formation of a B-mode image 210, i.e., a B-mode scan, such that the ultrasound beam is transmitted and received along the scan lines $S_1$-$S_{64}$. The control signal may further include a second control signal for controlling the formation of the C-mode image, i.e., a C-mode scan, such that the ultrasound beam is transmitted and received along scan lines $S_{10}$ to $S_{56}$ within a color box 220 set on the B-mode image 210. The control signal may also include a third control signal for controlling the transmission and reception of the ultrasound beam such that the ultrasound beam for the B-mode image is alternately transmitted and received along scan lines included in the respective scan line groups.

The transmit/receive unit 120 may be configured to transmit the ultrasound beam along scan lines set in a target object and receive ultrasound echoes reflected from the target object in response to the control signal. The transmit/receive unit 120 may be operable to sequentially transmit the ultrasound beam for the B-mode image along the scan lines $S_1$-$S_{64}$ in response to the first control signal and receive ultrasound echoes reflected from the target object to thereby form receive signals corresponding to the scan lines $S_1$-$S_{64}$ ("first receive signals"). The first receive signals may include information associated with the scan lines, e.g., position information of the scan lines, position information of sampling points on the scan lines, data obtained at the sampling points and the like.

The transmit/receive unit 120 may be configured to transmit the ultrasound beam for the C-mode image along the scan lines $S_{10}$-$S_{56}$ within the color box 220 in response to the second control signal and receive ultrasound echoes reflected from the target object to thereby form receive signals corresponding to the scan lines S10-S56 ("second receive signals"). The second receive signals may include information associated with the scan lines $S_{10}$-$S_{56}$, e.g., position information of the scan lines, position information of sampling points on the scan lines, data obtained from the sampling points and the like.

The transmit/receive unit 120 may be configured to transmit the ultrasound beam for a B-mode image along the scan lines $S_1$, $S_5$, $S_9$, $S_{13}$, $S_{17}$, . . . , $S_{53}$, $S_{57}$ and $S_{61}$ included in the first scan line group $SG_1$ and receive ultrasound echoes from the target object in response to the third control signal to thereby form receive signals corresponding to the scan lines included in the first scan line group $SG_1$ ("first scan line group receive signals"). The first scan line group receive signals may include information associated with the scan lines of the first scan line group $SG_1$, e.g., position information of the scan lines, position information of sampling points on the scan lines, data obtained from the sampling points and the like. The transmit/receive unit 120 may be configured to transmit the ultrasound beam for the C-mode image along the scan lines $S_{10}$-$S_{56}$ within the color box 220 and receive ultrasound echoes reflected from the target object in response to the second control signal to thereby form new second receive signals.

The transmit/receive unit 120 may be configured to transmit the ultrasound beam for a B-mode image along the scan lines $S_2$, $S_6$, $S_{10}$, $S_{14}$, $S_{18}$, . . . $S_{54}$, $S_{58}$ and $S_{62}$ included in the second scan line group $SG_2$ and receive ultrasound echoes from the target object in response to the third control signal to thereby form receive signals corresponding to the scan lines included in the second scan line group $SG_2$ ("second scan line group receive signals"). The second scan line group receive signals may include information associated with the scan lines of the first scan line group SG2, e.g., position information of the scan lines, position information of sampling points on the scan lines, data obtained from the sampling points and the like. The transmit/receive unit 120 may be configured to transmit the ultrasound beam for a C-mode image along the scan lines $S_{10}$-$S_{56}$ within the color box 220 and receive ultrasound echoes reflected from the target object in response to the second control signal to thereby form new second receive signals.

The transmit/receive unit 120 may be configured to transmit the ultrasound beam for a B-mode image along the scan lines $S_3$, $S_7$, $S_{11}$, $S_{15}$, $S_{19}$, . . . , $S_{55}$, $S_{59}$ and $S_{63}$ included in the third scan line group $SG_3$ and receive ultrasound echoes from the target object in response to the third control signal to thereby form receive signals corresponding to the scan lines included in the third scan line group $SG_3$ ("third scan line group receive signals"). The third scan line group receive signals may include information associated with the scan lines of the third scan line group $SG_3$, e.g., position information of the scan lines, position information of sampling points on the scan lines, data obtained from the sampling points and the like. The transmit/receive unit 120 may be configured to transmit the ultrasound beam for the C-mode image along the scan lines $S_{10}$-$S_{56}$ within the color box 220 and receive ultrasound echoes reflected from the target object in response to the second control signal to thereby form new second receive signals.

The transmit/receive unit 120 may be configured to transmit the ultrasound beam for a B-mode image along the scan lines $S_4$, $S_8$, $S_{12}$, $S_{16}$, $S_{20}$, . . . , $S_{56}$, $S_{60}$ and $S_{64}$ included in the fourth scan line group $SG_4$ and receive ultrasound echoes from the target object in response to the third control signal to thereby form receive signals corresponding to the scan lines included in the fourth scan line group $SG_4$ ("fourth scan line group receive signals"). The fourth scan line group receive signals may include information associated with the scan lines of the fourth scan line group $SG_4$, e.g., position information of the scan lines, position information of sampling points on the scan lines, data obtained from the sampling points and the like. The transmit/receive unit 120 may be configured to transmit the ultrasound beam for the C-mode image along the scan lines $S_{10}$-$S_{56}$ within the color box 220 and receive ultrasound echoes reflected from the target object in response to the second control signal to thereby form new second receive signals. The transmit/receive unit 120 may be configured to repeat the above process until an end request is inputted.

The control unit 130 may sequentially store the first receive signals, the second receive signals and the first to fourth scan line group receive signals.

Figure 4:
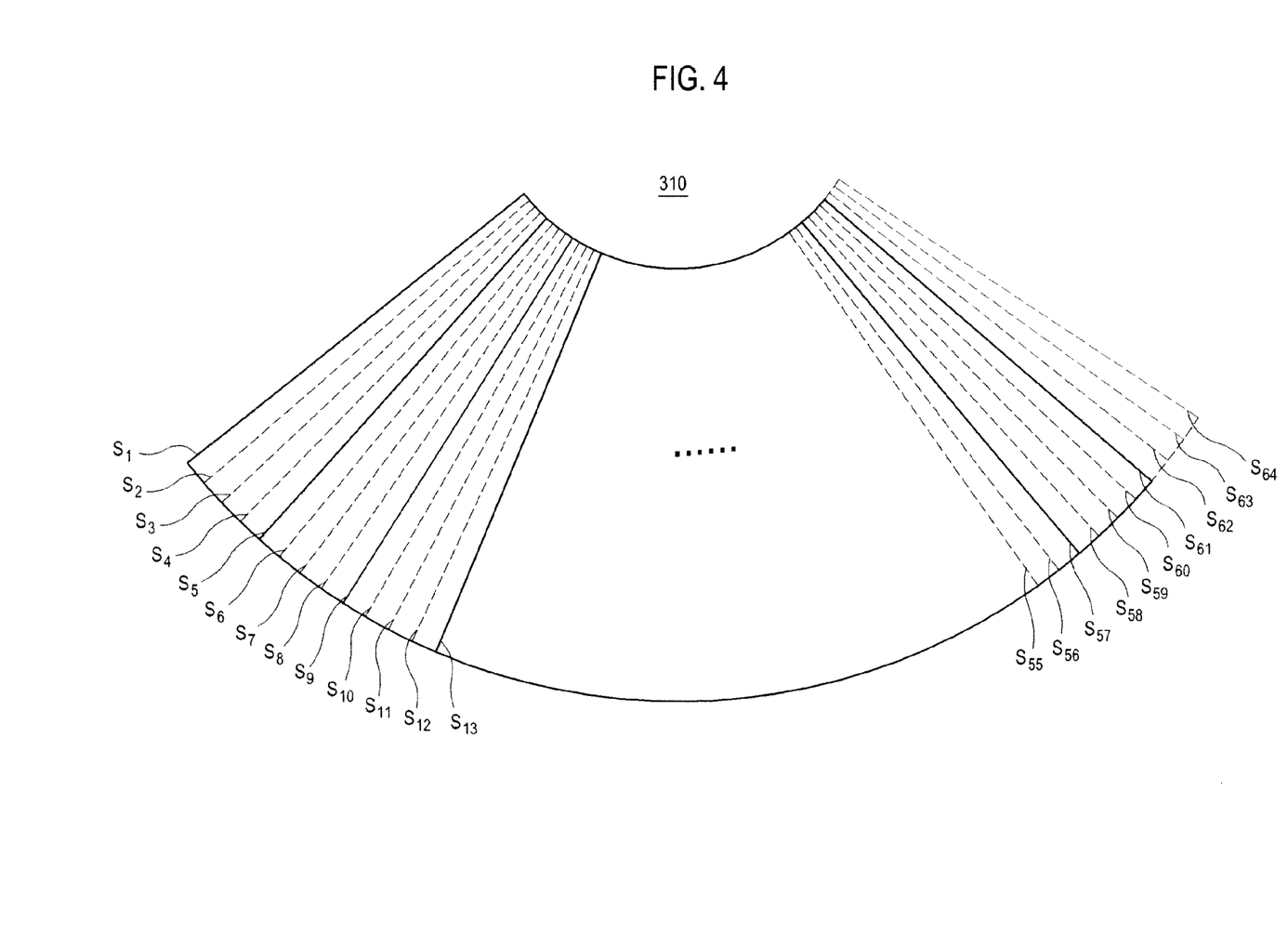
FIGS. 4 to 7 are diagrams showing examples of forming a B-mode image in accordance with one embodiment of the present invention.

The image processing unit 140 may be configured to extract the first receive signals from the storage unit 130 and form a B-mode image based on the first receive signals. The image processing unit may be configured to extract the second receive signals from the storage unit 130 and form a C-mode image based on the extracted second receive signals. The image processing unit 140 may be configured to combine the B-mode image with the C-mode image to form a BC-mode image. Subsequently, the image processing unit 140 may be configured to extract the first scan line group receive signals and the first receive signals in which the receive signals corresponding to the scan lines included in the first scan line group SG1 are excluded to update the first receive signals. The image processing unit 140 may be configured to form a B-mode image 310 based on the updated first receive signals, as illustrated in FIG. 4. The image processing unit may extract the new second receive signals from the storage unit 130 and form a C-mode image based on the extracted second receive signals. Thereafter, the image processing unit 140 may be operable to combine the B-mode image 310 with the C-mode image to form a BC-mode image.

Figure 5:
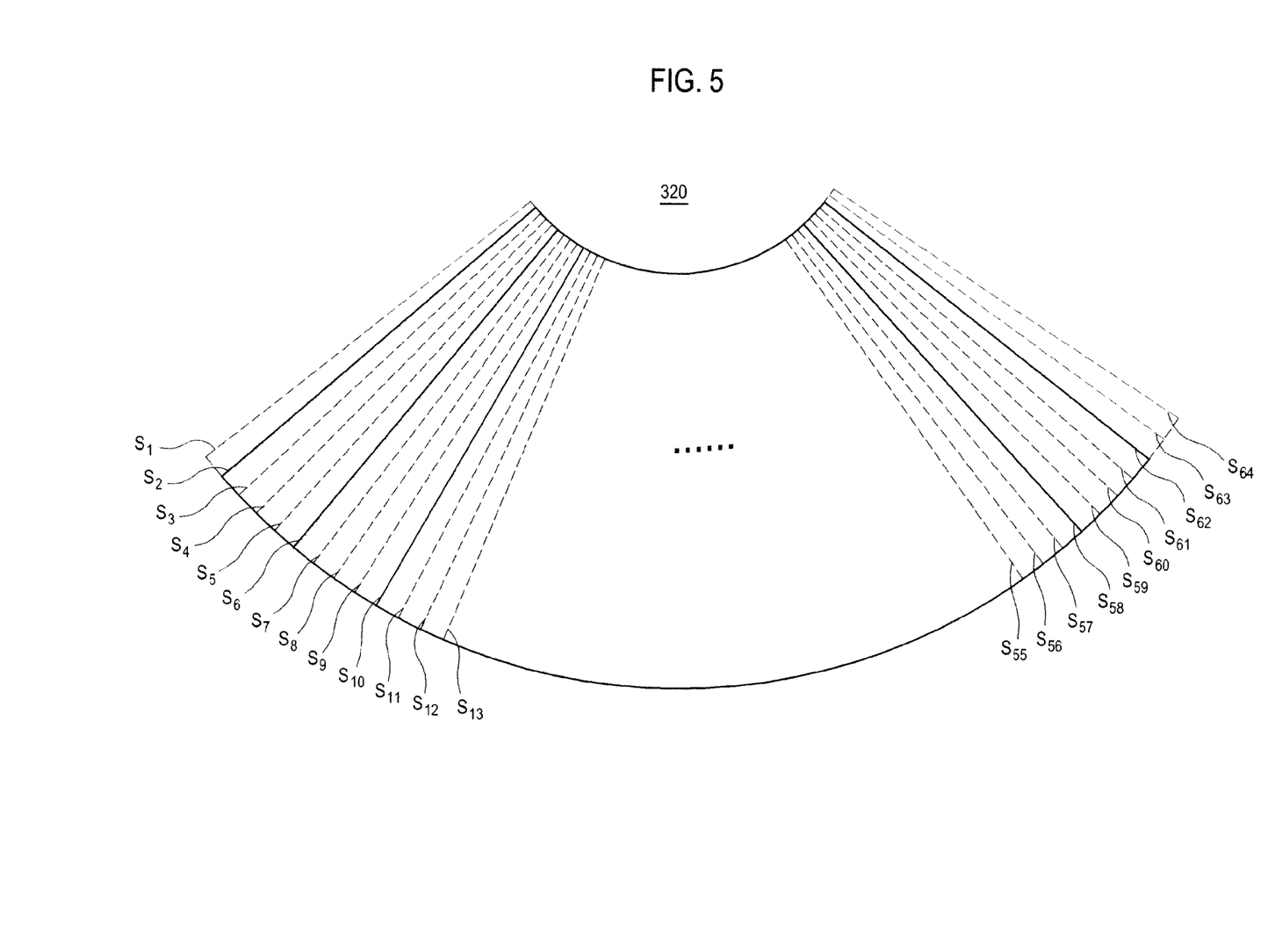

The image processing unit 140 may be configured to extract the second scan line group receive signals and the first receive signals in which the receive signals corresponding to the scan lines included in the second scan line group $SG_2$ are excluded to update the first receive signals. As illustrated in FIG. 5, the image processing unit 140 may be configured to form a B-mode image 320 based on the updated first receive signals. The image processing unit may extract the new second receive signals from the storage unit 130 and form a C-mode image based on the extracted new second receive signals. Thereafter, the image processing unit 140 may be configured to combine the B-mode image 320 with the C-mode image to form a BC-mode image.

Figure 6:
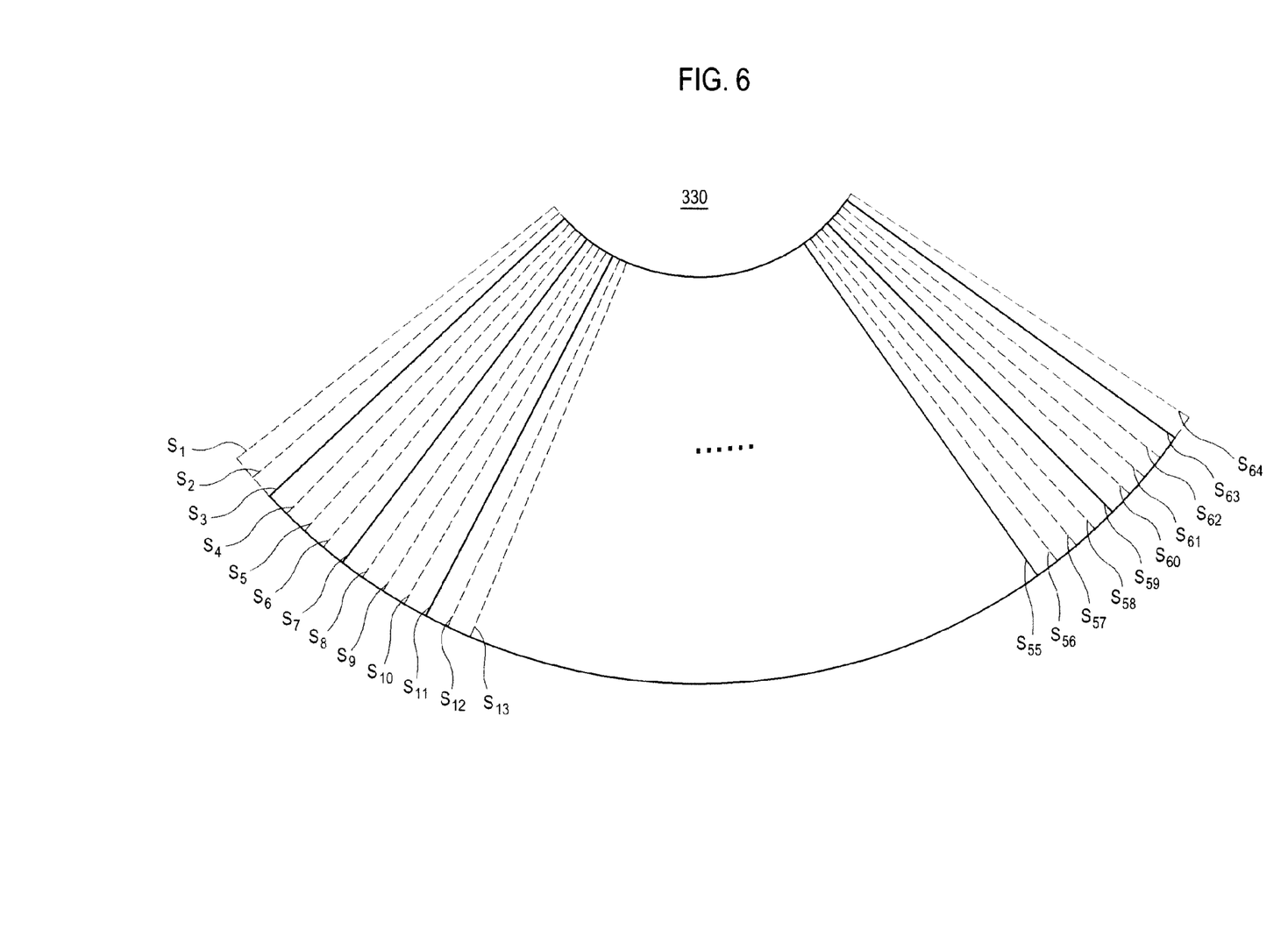

The image processing unit 140 may be configured to extract the third scan line group receive signals and the first receive signals in which the receive signals corresponding to the scan lines included in the third scan line group $SG_3$ are excluded to update the first receive signals. As illustrated in FIG. 6, the image processing unit 140 may be configured to form a B-mode image 330 based on the updated first receive signals. The image processing unit may extract the new second receive signals from the storage unit 130 and form a C-mode image based on the extracted second receive signals.

Thereafter, the image processing unit 140 may be configured to combine the B-mode image 330 with the C-mode image to form a BC-mode image.

Figure 7:
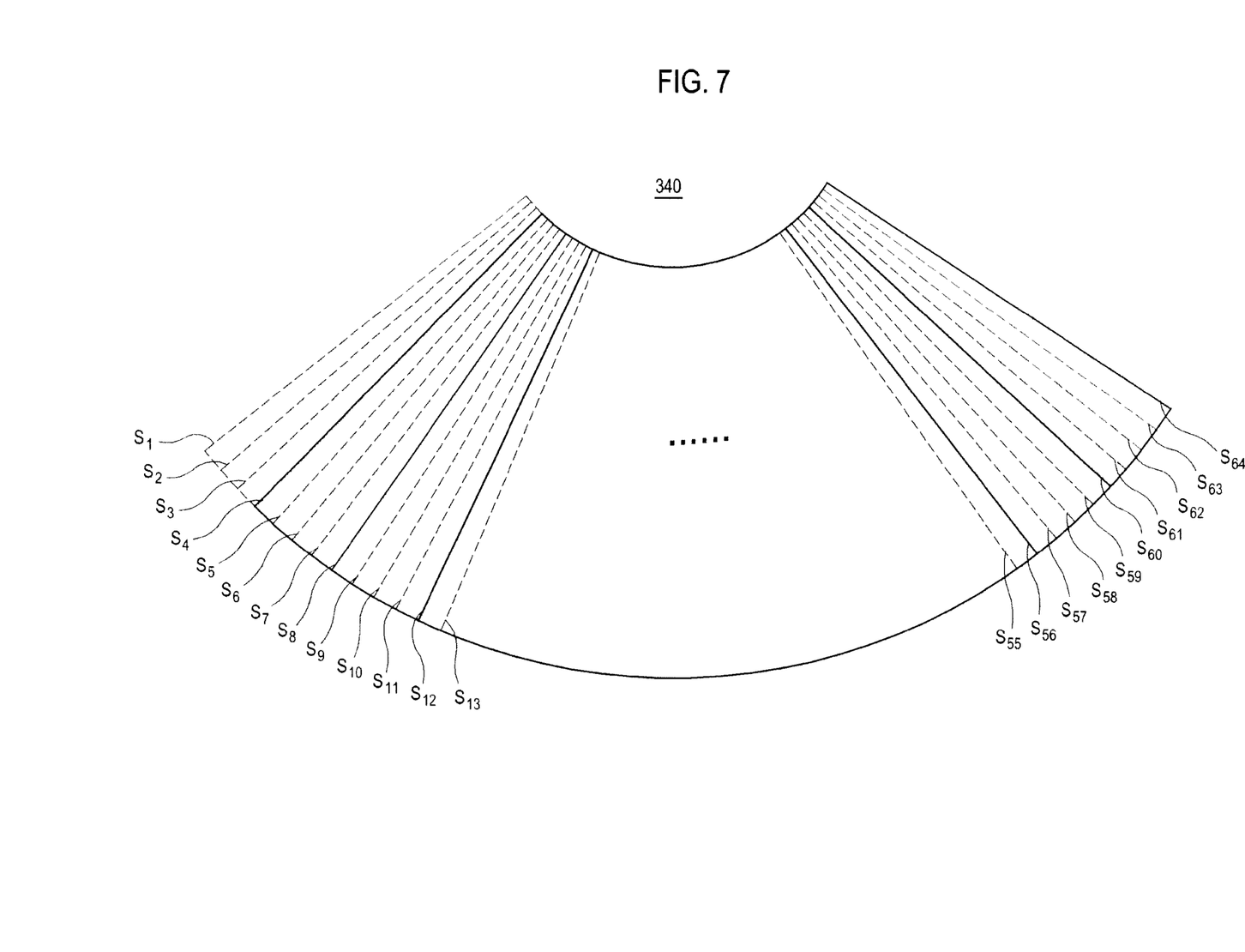

The image processing unit 140 may be configured to extract the fourth scan line group receive signals and the first receive signals in which the receive signals corresponding to the scan lines included in the fourth scan line group $SG_4$ are excluded to update the first receive signals. As illustrated in FIG. 7, the image processing unit 140 may be configured to form a B-mode image 340 based on the updated first receive signals. The image processing unit may extract the new second receive signals from the storage unit 130 and form a C-mode image based on the extracted second receive signals. Thereafter, the image processing unit 140 may be configured to combine the B-mode image 340 with the C-mode image to form a BC-mode image. The image processing unit 140 may repeatedly carry out the above process until an end request is inputted.

The display unit 150 may be configured to display the B-mode image and the BC-mode image formed in the image processing unit 140.

As mentioned above, since the time required to form the B-mode image may be reduced in accordance with the present invention, the frame rate of the BC-mode image may be improved.

In accordance with one embodiment of the present invention, there is provided an ultrasound system, comprising: a control unit for generating a first control signal for a B-mode scan and a second control signal for a C-mode scan; a transmit/receive unit responsive to the first and second control signals and being configured to transmit ultrasound signals along a plurality of scan lines set in a target object and form receive signals based on the ultrasound echo signals reflected from the target object, said receive signals including first receive signals formed in response to the first control signal and the second receive signals formed in response to the second control signal; a storage unit for storing the first and second receive signals; and an image processing unit for forming a B-mode image and a C-mode image based on the first and second receive signals stored in the storage unit and being configured to combine the B-mode image with the C-mode image to form a BC-mode image, wherein the control unit is configured to divide the scan lines into a plurality of scan line groups and generate a third control signal for an alternate B-mode scan along scan lines of the respective scan line groups, the control unit being further configured to repeatedly generate the second and third control signals, wherein the receive signals further include scan line group receive signals formed in response to the third control signal, and wherein the image processing unit is configured to update the first receive signals with the scan line group receive signals and form a B-mode image based on the updated first receive signals.

In accordance with another embodiment of the present invention, there is provided a method of forming a BC-mode image, comprising: a) generating a first control signal for a B-mode scan and a second control signal for a C-mode scan; b) transmitting ultrasound signals along a plurality of scan lines set in a target object and form first receive signals and second receive signals based on the ultrasound echo signals reflected from the target object in response to the first and second control signals, respectively; c) forming a B-mode image and a C-mode image based on the first and second receive signals, respectively, and combining the B-mode image with the C-mode image to form a BC-mode image; d) dividing the scan lines into a plurality of scan line groups based on a first time duration required to form the B-mode image and a second time duration required to form the C-mode image; e) generating a third control signal for an alternate B-mode scan along scan lines of the respective scan line groups; f) updating the first receive signals with receive signal formed in response to the third control signal; g) forming a new B-mode image based on the updated first receive signals; h) generating the second control signal to thereby form new C-mode image and combining the new B-mode image with the new C-mode image to form a new BC-mode image; and i) repeating steps e) to h).

Any reference in this specification to "one embodiment," "an embodiment," "example embodiment," etc. means that a particular feature, structure or characteristic described in connection with the embodiment is included in at least one embodiment of the present invention. The appearances of such phrases in various places in the specification are not necessarily all referring to the same embodiment. Further, when a particular feature, structure or characteristic is described in connection with any embodiment, it is submitted that it is within the purview of one skilled in the art to effect such feature, structure or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An ultrasound system, comprising:
a control unit configured to generate a first control signal for a B-mode scan and a second control signal for a C-mode scan:
a transmit/receive unit responsive to the first and second control signals and being configured to transmit ultrasound signals along a plurality of predetermined number of scan lines set in a target object and form receive signals based on the ultrasound echo signals reflected from the target object, said receive signals including first receive signals formed in response to the first control signal and second receive signals formed in response to the second control signal;
a storage unit configured to store the first and second receive signals;
and an image processing unit configured to form a B-mode image and a C-mode image based on the first and second receive signals stored in the storage unit and to combine the B-mode image with the C-mode image to form a BC-mode image,
wherein the control unit is configured to divide the scan lines into a plurality of scan line groups where the B-mode scan line groups are determined by the equation of $T_B = N_B/PRF_B$ and C-mode scan lines groups are determined by the equation of $T_c = (N_c \times P_s)/PRF_c$ and generate a third control signal for alternately selecting one of the scan line groups for a B-mode scan along scan lines of the selected scan line group based on a time ratio, the control unit being further configured to repeatedly generate the second and third control signals,
wherein the receive signals include scan line group receive signals formed through the B-mode scan along scan lines of the selected scan line group in response to the third control signal and new second receive signals formed in response to the second control signal, and wherein the image processing unit is configured to update the first receive signals with the scan line group receive signals, and form a new B-mode image based on the updated first receive signals and a new C-mode image based on the new second receive signals and combine the new B-mode image with the new C-mode image to form a new BC-mode image.

2. The ultrasound system of claim 1, further comprising an input unit configured to receive a user input for setting a color box on the B-mode image, wherein the C-mode scan is carried out along scan lines within the color box.

3. The ultrasound system of claim 2, wherein the control unit includes:
  a time computing unit configured to compute a first time duration required to form the B-mode image and a second time duration required to form the C-mode image;
  a scan line group setting unit configured to divide the first time duration by the second time duration and divide the scan lines into the plurality of scan line groups based on the division result, wherein each of the scan line groups include different scan lines; and
  a control signal generating unit for generating the control signal.

4. The ultrasound system of claim 1, wherein the storage unit is configured to store the updated first receive signals.

5. A method of forming a BC-mode image, comprising:
  a) generating a first control signal for a B-mode scan and a second control signal for a C- mode scan:
  b) transmitting ultrasound signals along a plurality of predetermined number of scan lines set in a target object and form first receive signals and second receive signals based on the ultrasound echo signals reflected from the target object in response to the first and second control signals, respectively;
  c) forming a B-mode image and a C-mode image based on the first and second receive signals, respectively, and combining the B-mode image with the C-mode image to form a BC-mode image;
  d) dividing the scan lines into a plurality of scan line groups based on a first time duration required to form the B-mode image based on equation of $T_B=N_B/PRF_B$ and a second time duration required to form the C-mode image based on equation of $T_c=(N_c \times P_s)/PRF_c$;
  e) generating a third control signal for alternately selecting one of the scan line groups for a B-mode scan along scan lines of the selected scan line group to form scan line group receive signals;
  f) updating the first receive signals with the scan line group receive signals formed through the B-mode scan along scan lines of the selected scan line group in response to the third control signal;
  g) forming a new B-mode image based on the updated first receive signals; h) generating the second control signal to thereby form a new C-mode image and combining the new B-mode image with the new C-mode image to form a new BC-mode image; and
  i) repeating steps e) to h).

6. The method of claim 5, further comprising receiving a user input for setting a color box on the B-mode image, wherein the C-mode scan is carried out along scan lines within the color box.

7. The method of claim 6, wherein the step d) includes:
  dividing the first time duration by the second time; and
  dividing the scan lines into the plurality of scan line groups based on the division result,
  wherein each of the scan line groups include different scan lines.

8. The method of claim 5, further comprising the first receive signals, the second receive signals and the updated first receive signals.

* * * * *